(12) United States Patent
Saniee et al.

(10) Patent No.: US 11,188,617 B2
(45) Date of Patent: Nov. 30, 2021

(54) METHOD AND NETWORK NODE FOR INTERNET-OF-THINGS (IOT) FEATURE SELECTION FOR STORAGE AND COMPUTATION

(71) Applicant: Nokia Technologies OY, Espoo (FI)

(72) Inventors: Iraj Saniee, New Providence, NJ (US); Christos Mavridis, Murray Hill, NJ (US)

(73) Assignee: Nokia Technologies OY, Espoo (FI)

( * ) Notice: Subject to any disclaimer, the term of this patent is extended or adjusted under 35 U.S.C. 154(b) by 252 days.

(21) Appl. No.: 16/244,707

(22) Filed: Jan. 10, 2019

(65) Prior Publication Data
US 2020/0226199 A1 Jul. 16, 2020

(51) Int. Cl.
*G06F 17/16* (2006.01)
*G06K 9/62* (2006.01)
*H04L 29/08* (2006.01)

(52) U.S. Cl.
CPC ............ *G06F 17/16* (2013.01); *G06K 9/623* (2013.01); *G06K 9/629* (2013.01); *H04L 67/12* (2013.01)

(58) Field of Classification Search
CPC ......... G06F 17/16; G06K 9/623; G06K 9/629
See application file for complete search history.

(56) References Cited

U.S. PATENT DOCUMENTS

| | | | | |
|---|---|---|---|---|
| 2002/0013801 A1* | 1/2002 | Kobayashi | .............. | G06F 17/16 708/607 |
| 2009/0222400 A1* | 9/2009 | Kupershmidt | ........ | G06F 16/285 706/52 |
| 2010/0284620 A1* | 11/2010 | Chertok | .............. | G06F 16/5854 707/752 |
| 2013/0212095 A1* | 8/2013 | Barad | ..................... | G06F 16/93 707/730 |

(Continued)

FOREIGN PATENT DOCUMENTS

CN 108537288 A 9/2018

OTHER PUBLICATIONS

Taiji Suzuki et al., "Sufficient Dimension Reduction via Squared-loss Mutual Information Estimation", vol. 9 of JMLR: W&CP Sep. 2010.

(Continued)

*Primary Examiner* — Robert Stevens
*Assistant Examiner* — Jedidiah P Ferrer
(74) *Attorney, Agent, or Firm* — Harness, Dickey & Pierce, P.L.C.

(57) ABSTRACT

The method includes compiling data into mutual information columns, determining mutual information for each pairing of the mutual information columns and creating a matrix using the mutual information, the matrix including a first set of data columns, wherein each of the first set of data columns represents at least one feature of the data. The method further includes computing eigenvalues and eigenvectors of the matrix, ordering the eigenvalues using an (Continued)

absolute value of the eigenvalues, iteratively selecting at least one second set of data columns by successively removing data columns from the first set of data columns based on the ordered eigenvalues, and controlling an operation of an electronic device based on the at least one second set of data.

16 Claims, 7 Drawing Sheets

(56) References Cited

U.S. PATENT DOCUMENTS

| | | | |
|---|---|---|---|
| 2015/0186775 A1* | 7/2015 | Mota | G06N 20/00 |
| | | | 706/46 |
| 2016/0367198 A1* | 12/2016 | Chon | A61B 5/02416 |
| 2018/0095751 A1* | 4/2018 | Aminot | G06F 9/30101 |
| 2019/0042539 A1* | 2/2019 | Kalsi | G06F 17/16 |
| 2019/0095716 A1* | 3/2019 | Shrestha | G06K 9/00771 |

OTHER PUBLICATIONS

Ali Shadvar, "Dimension Reduction by Mutual Information Discriminant Analysis", International Journal of Artificial Intelligence & Applications (IJAIA), vol. 3, No. 3, May 2012.

Heba Ali et al., 'A Big Data Processing Framework Based on MapReduce With Application to Internet of Things' *Ciência e Técnica Vitivinícola*, vol. 31. No. 7, Jul. 2016.

Extended European Search Report dated Jul. 29, 2020, issued in corresponding European Patent Application No. 19216420.0.

* cited by examiner

FIG. 1

| $F_1$ | $F_2$ | ... | $F_K$ | $F_{K+1}$ | ... | $F_N$ |
|---|---|---|---|---|---|---|
| A | B | ... | B | 0.2 | ... | 0.9 |
| B | B | ... | C | 0.4 | ... | 0.5 |
| ... | ... | ... | ... | ... | ... | ... |
| D | D | ... | A | 1.0 | ... | 0.8 |
| ... | ... | ... | ... | ... | ... | ... |

FIG. 2

| PERSON | GENDER | WHITE | YOUTH | HAIR COLOR | SMILING | EYE COLOR | PALE SKIN |
|---|---|---|---|---|---|---|---|
| CHRISTINA RICCI | FEMALE | 1.32 | 0.8 | 1.21 | 1.01 | BROWN | 0.03 |
| CAMERON DIAZ | FEMALE | 0.28 | 1.08 | -0.40 | 1.56 | BLUE | -2.47 |
| HARRISON FORD | MALE | 1.31G | -0.78 | ..... | ..... | BLUE | ..... |
| ..... | | | | | | ..... | |

METHOD AND NETWORK NODE FOR INTERNET-OF-THINGS (IOT) FEATURE SELECTION FOR STORAGE AND COMPUTATION

BACKGROUND OF THE INVENTION

Field of Invention

Example embodiments relate generally to a method and a network node for internet-of-things (IoT) feature selection for storage and computation.

Related Art

The internet-of-things (IoT) is a network of objects, devices, vehicles, home appliances, etc., that contain one or more transceivers that allow these items to connect, interact, and exchange data. The IoT extends internet connectivity beyond computers, desktops, laptops, tablets and phones, to any type of object with the one or more transceivers. Internet-enabled objects, that utilize IoT, may collect a large amount of data.

SUMMARY OF INVENTION

At least one example embodiment is directed toward a method of feature selection.

In one example embodiment, the method includes compiling, by at least one first processor of a first network node, data into mutual information columns; determining, by the at least one first processor, mutual information for each pairing of the mutual information columns; creating, by the at least one first processor, a matrix using the mutual information, the matrix including a first set of data columns, wherein each of the first set of data columns represents at least one feature of the data; computing, by the at least one first processor, eigenvalues and eigenvectors of the matrix; ordering, by the at least one first processor, the eigenvalues using an absolute value of the eigenvalues; iteratively selecting, by the at least one first processor, at least one second set of data columns by successively removing data columns from the first set of data columns based on the ordered eigenvalues; and controlling, by the at least one first processor, an operation of an electronic device based on the at least one second set of data columns.

In one example embodiment, the ordering includes ordering the absolute value of the eigenvalues in descending order, and the iteratively selecting includes, selecting the at least one second set of data columns that are maximally aligned with the eigenvectors, the selecting including sequentially choosing highest-ordered eigenvalues, of the ordered eigenvalues.

In one example embodiment, the matrix is symmetric and non-negative.

In one example embodiment, the method further includes confirming that the matrix is symmetric and non-negative prior to the computing of the eigenvalues.

In one example embodiment, the at least one second set of data columns is smaller than the first set of data columns.

In one example embodiment, the matrix is sized to be n×n, where n is a positive integer that represents a total number of features for the data.

In one example embodiment, the iteratively selecting is performed until a size of the at least one second set of data columns is equal to or smaller than a determined value or a threshold value.

In one example embodiment, the iteratively selecting includes, normalizing a vector for each of the first set of data columns, and successively removing data columns by iteratively calculating a maximal alignment between the normalized vectors and the eigenvalues and removing the data columns associated with the normalized vectors that are maximally aligned.

In one example embodiment, the electronic device is an internet-of-things (IoT) device.

At least another example embodiment is directed toward a network node.

In one example embodiment, the network node includes a memory including computer-readable instructions; and at least one first processor configured to read the computer-readable instructions in order to, compile data into mutual information columns, determine mutual information for each pairing of the mutual information columns, create a matrix using the mutual information, the matrix including a first set of data columns, wherein each of the first set of data columns represents at least one feature of the data, compute eigenvalues and eigenvectors of the matrix, order the eigenvalues using an absolute value of the eigenvalues, iteratively select at least one second set of data columns by successively removing data columns from the first set of data columns based on the ordered eigenvalues, and control an operation of an electronic device based on the at least one second set of data columns.

In one example embodiment, the at least one first processor is further configured to, order the eigenvalues by ordering the absolute value of the eigenvalues in descending order, and iteratively select the at least one second set of data columns by selecting the at least one second set of data columns that are maximally aligned with the eigenvectors, the selecting including sequentially choosing highest-ordered eigenvalues, of the ordered eigenvalues.

In one example embodiment, the matrix is symmetric and non-negative.

In one example embodiment, the at least one first processor is further configured to, confirm that the matrix is symmetric and non-negative prior to the computing of the eigenvalues.

In one example embodiment, the at least one second set of data columns is smaller than the first set of data columns.

In one example embodiment, the matrix is sized to be n×n, where n is a positive integer that represents a total number of features for the data.

In one example embodiment, the at least one first processor is further configured to, iteratively select the at least one second set of data columns by iteratively selecting until a size of the at least one second set of data columns is equal to or smaller than a determined value or a threshold value.

In one example embodiment, the at least one first processor is further configured to, iteratively selecting by, normalizing a vector for each of the first set of data columns, and successively removing data columns by iteratively calculating a maximal alignment between the normalized vectors and the eigenvalues and removing the data columns associated with the normalized vectors that are maximally aligned.

In one example embodiment, the electronic device is an internet-of-things (IoT) device.

DETAILED DESCRIPTION

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic, optical, or flash memory, etc. Similarly, the transmission medium may be twisted wire pairs, coaxial cable, optical fiber, or some other suitable transmission medium known to the art. The example embodiments not limited by these aspects of any given implementation.

General Methodology

Internet-enabled devices or objects, which are enabled by internet-of-things (IoT) technology, collect potentially large amounts of data. In an example embodiment, data may be in the form of temperature or pressure, user names or user identifiers (IDs), counts of hourly transmissions, network usage, network latency, etc. These examples can be considered attributes or features of the data. In some of the instant example embodiments, the set of attributes or features is presumed to have already been obtained by an IoT device, and any physical (or higher) layer sensing the attributes have been incorporated into the IoT device. In an example embodiment, prioritization and/or evaluation of the importance of each feature is a relevant concern. The attributes and/or features of each data record often include at least some overlap and/or redundancy. Even when there is no evident correlation between these attributes/features, they still may be functionally related in non-linear ways that may not necessarily be captured via statistical correlation measures. For example, a call record, stored electronically by a service provider, may have over one hundred attributes which may include user name and gender of the user, area code of the user, start time, end time, and duration of a call, an identity of a network plan for a user's call, an identity of a discounted network plan for the user, etc. Often, only a dozen or fewer of these attributes/features contain significantly important information (data) for any specific task or be valuable in general, while many other attributes/features repeat or overlap other data and/or the significantly important data. A service provider may have access to billions of data records each day. To store the data for future analytics, often times only a small fraction of the data would be sufficient. Identifying attributes that contain maximal (important) information for each data record, especially if the information is mutually independent from other attributes/features, is therefore of significant value. Identifying this maximally important information not only would reduce, by orders of magnitude, storage costs-but, such identification would also simplify analytics and computations, during analytical use of the information.

Figure 1:
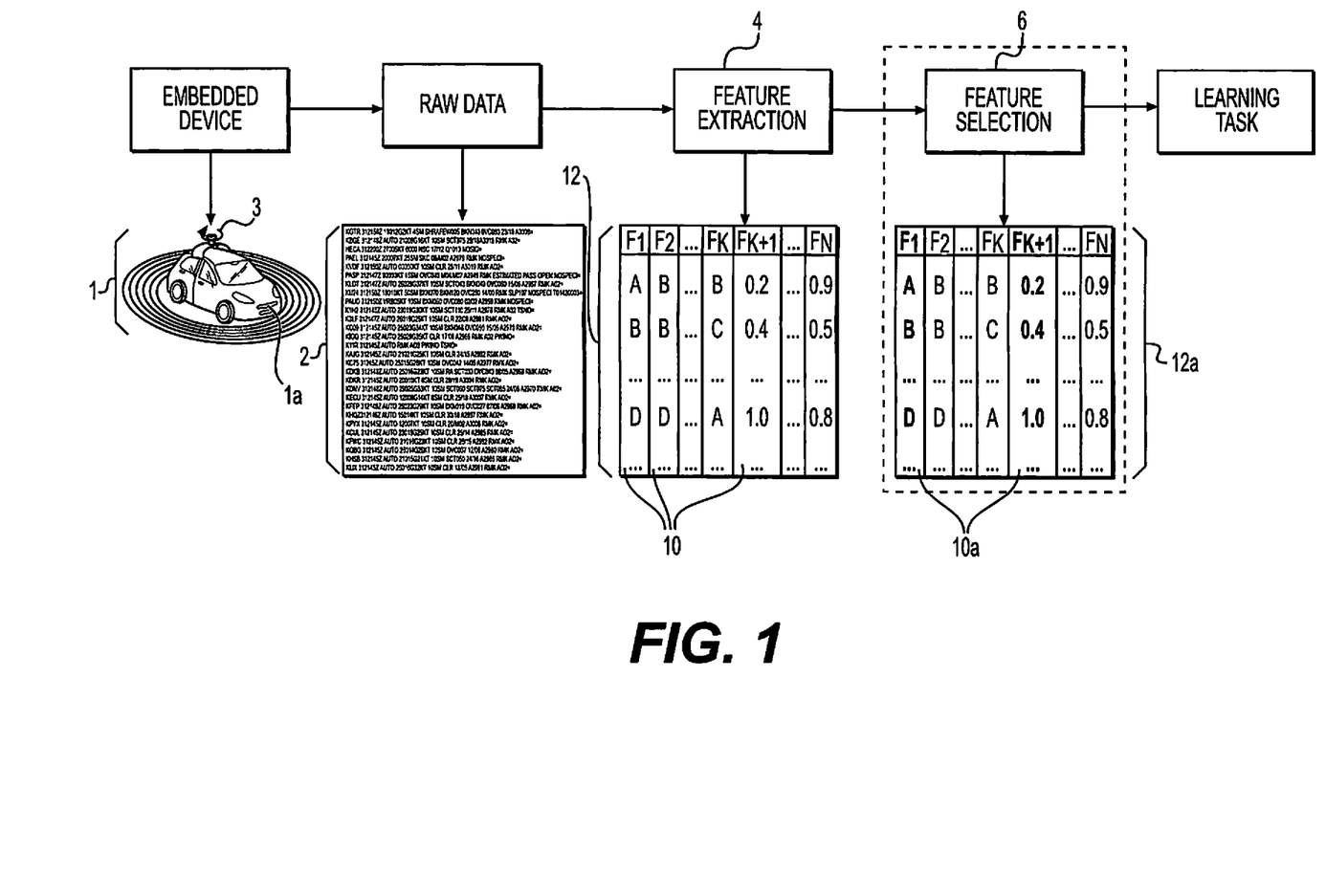
FIG. 1 illustrates a progression of raw data being collected, extracted and selected, in accordance with an example embodiment.

FIG. 1 illustrates a progression of raw data 2 being collected by an IoT device (in this instance, a vehicle) 1, extracted (4) and selected (6), in accordance with an example embodiment. In an example embodiment, the raw data 2 is tabulated into columns (10) of a table 12. In an example embodiment, a problem of feature selection of this data pertains to identification of a few, typically less than a dozen, important features (maximally important information) out of possibly dozens, hundreds or even thousands of features of data that are collected. This identification of important information allows information loss to be kept to a minimum. In an example embodiment, this problem is solved by picking and storing only a small number of the columns 10 from the table 12, from potentially millions of organized rows/records of the collected raw data 2, where each column 10 of the table 12 represents a 'feature' of the raw data 2. In FIG. 1, the columns 10a in table 12a include those identified features that are to be retained as 'significantly (maximally) important data,' following a selection process 6.

Figure 2:
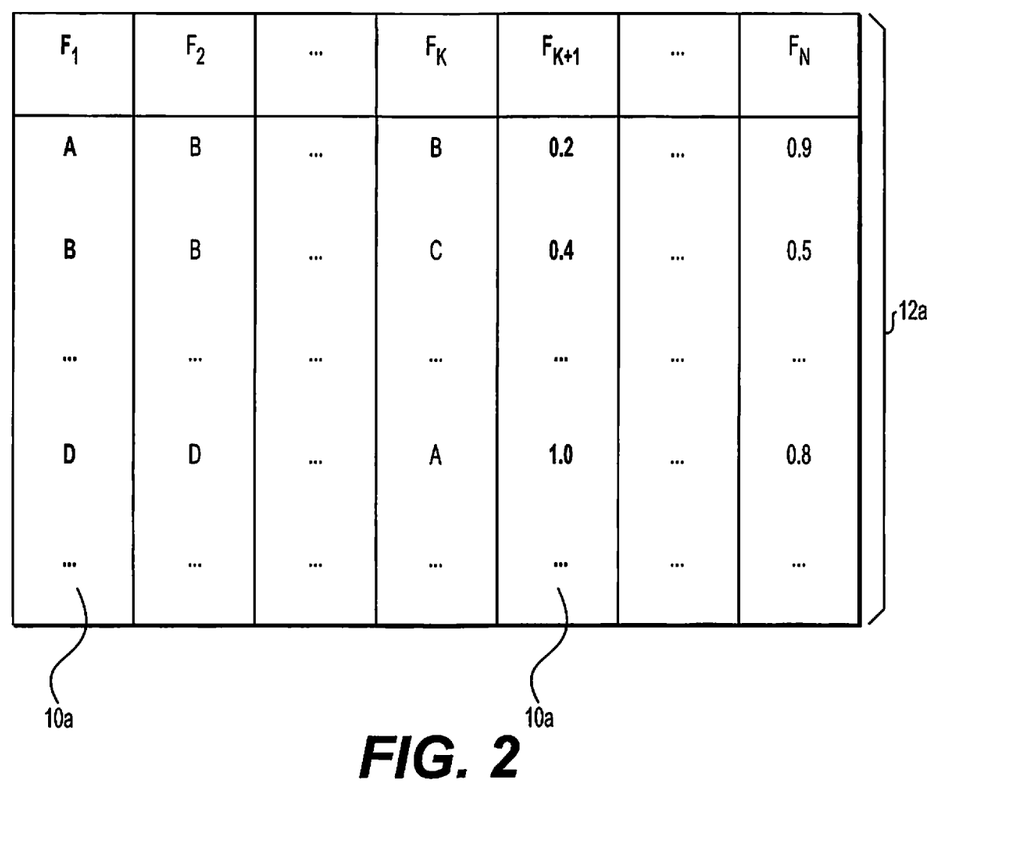
FIG. 2 illustrates a table of selected data, in accordance with an example embodiment.

FIG. 2 displays table 12a in more detail, where two of the columns 10a in the table 12a have been identified as containing the identified 'significantly (maximally) important data.' In an example embodiment, the feature selection process 6 improves the quality of data that an IoT system maintains. This selection thus can significantly contribute to the IoT systems' ability to curate relevant and high-quality data.

Figure 3:
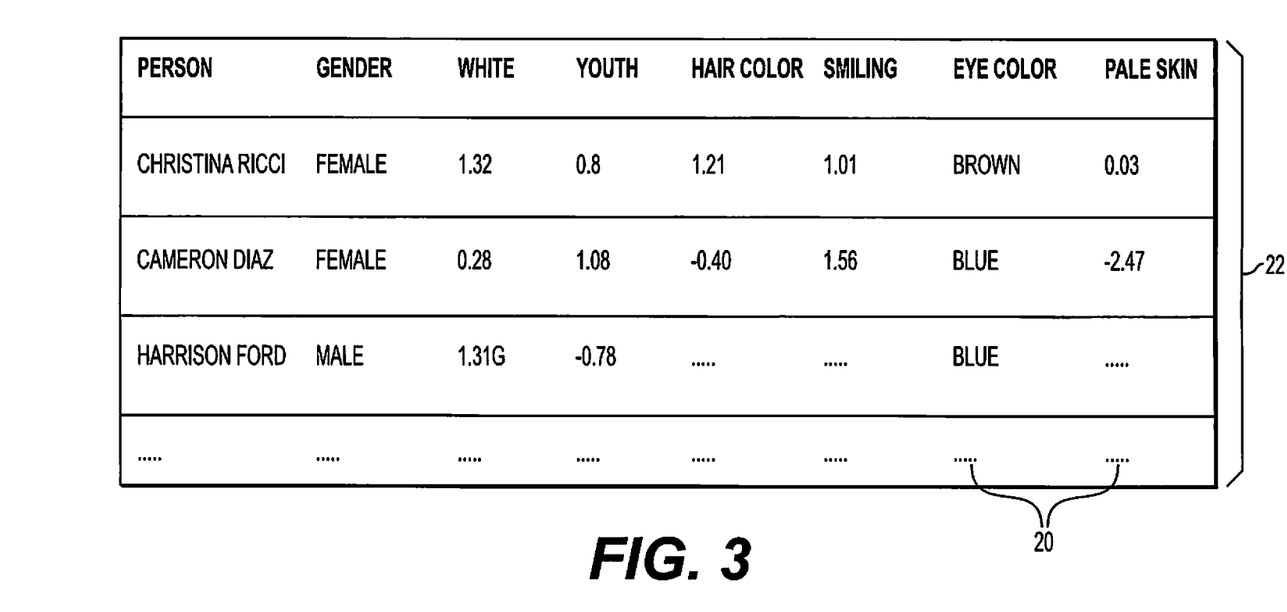
FIG. 3 illustrates a table of raw data, in accordance with an example embodiment.
Figure 4:
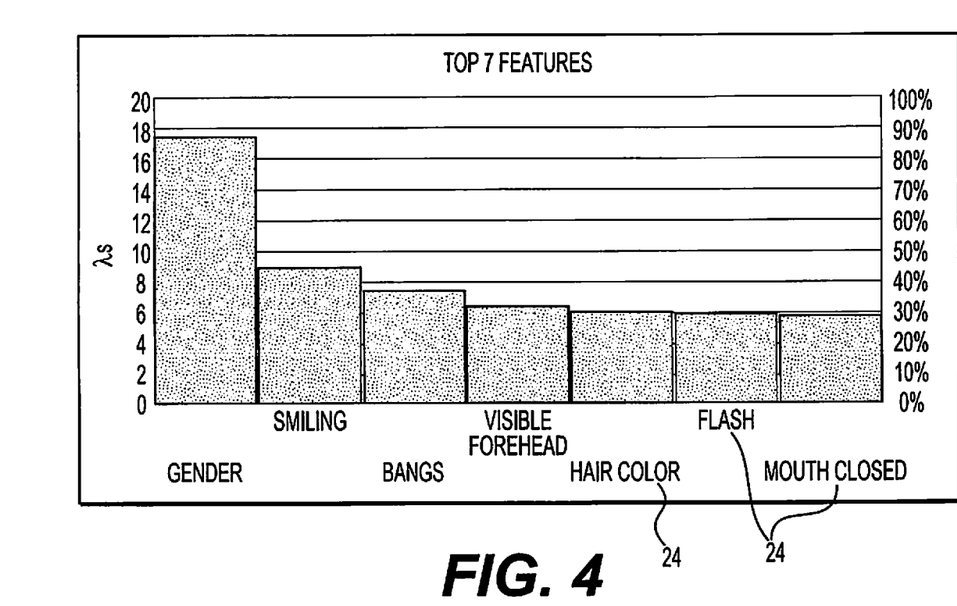
FIG. 4 illustrates a diagram of selected features, in accordance with an example embodiment.

FIG. 3 depicts a table 22 according to an example embodiment. The table 22 was devised from raw data training database that involved approximately 300 photographs for each of 200 public figures (a total of almost 60,000 photos in the training database), where 73 features were applied to the raw data to identify facial parameters (only 3 of the 200 celebrities, and only 7 of the 73 features, are shown in table 22). The 7 features are tabulated in columns 20 of the table 22. A complete discussion of this public figure database can be found at: http://www.cs.columbia.edu/CAVE/projects/faceverification/. FIG. 4 illustrates a diagram of the selected features 24, in accordance with an example embodiment. Specifically, the diagram depicts the seven maximally important features 24 that were selected from the initially large number of features of the raw data.

Factors to Consider in Feature Selection

In an example embodiment, four factors are emphasized when identifying significantly important data: 1) Features can not only be binary and numerical, but they can also be symbolic or in text form; 2) At the outset of the instant example embodiments, a priori knowledge of a relationship between a particular feature (e.g., feature Z), and other features (e.g., features X, Y, etc.), are not known—and therefore, it is not known whether some or all of the features are functions of each other; 3) Contrary to conventional data collection and analytics, IoT devices can generate data in very large (effectively unlimited) quantities; and 4) Feature identification and selection may be an offline process that is performed prior to applications, online use, etc.

Conventional Attempts to Identify Important Features

Conventional techniques to identify important variables, among a large number of possible candidate variables, exist. These conventional techniques to identify key features include multivariable linear regression (MLR), principal components analysis (PCA), independent components analysis (ICA) and multivariate non-linear regression (MNR). However, these approaches have fundamental shortcomings when applied to IoT databases, where these shortcomings include: 1) The conventional techniques require numerical or binary data, causing all symbolic and text features to need to be converted via an arbitrary scheme to numerical values; 2) MLR and PCA apply and determine features based on high coefficients (in MLR) and high correlation (PCA) with a metric. Thus, functional relationships between features, or between features and an external metric, which may not be linear, are not able to be captured by these tools. Even in MNR, the functional form of the relationship needs to be assumed a priori before it can be utilized. It follows that non-linear and non-numerical features are not adequately covered by traditional statistical methods. Therefore, there is a significant benefit in utilizing the instant example embodiments that do not require purely numerical features and can capture causal relationship between features, whether the relationships are linear, non-linear, and/or not known.

Mechanisms of Example Method Embodiments

In an example embodiment, two mechanisms are proposed. The first mechanism is generically applicable to IoT, and the second mechanism is specific to feature prioritization from an abstract set of features extracted from deep learning for use in an IoT application.

In an example embodiment, the first mechanism is based on computation of an nxn mutual information matrix (MIM) 30 (see FIG. 4), where n is a positive integer representing a total number of input features, and an entry m(i,j) is mutual information between two columns i and j, as shown in Table 12a of FIG. 2. Each column (31) of the matrix (30) represents a feature of the data (2). The matrix (30) is non-negative and symmetric, and thus the matrix (30) has real eigenvalue and eigenvectors. In an example embodiment, a magnitude of the eigenvalue is used to determine an importance or priority of each eigenvector. Once the magnitude has been determined, then the features with maximal alignment with each eigenvector is selected, one at a time, until a pre-set number of features are obtained.

FIG. 4 illustrates a general process of forming a mutual information matrix (MIM) (30) of features, ordering eigenvalues and scoring features of the data, in accordance with an example embodiment. Specifically, the raw data is organized into the matrix (MIM) (30), where each column (31) of the matrix (30) represents a feature of the data. Eigenvalues and eigenvectors (33) are calculated from the matrix (30). In an example embodiment, eigenvectors (33) of the matrix (30) are ordered by absolute value of their eigenvalues, and then the ordering and scoring of the features is based on their maximal alignment with the eigenvectors, where the ordering and scoring is accomplished by the following: A) Order the eigenvectors by the absolute value of their eigenvalues, B). This can be done efficiently only k times where k<<n. Now, for the top k<<n eigenvectors v1, v2, v3, ..., v(k) determine which feature most aligns with v1, and call it $f_{\pi(1)}$, and remove this feature from further consideration. Of the remaining features, determine which features most align with v2 and thus least aligns with v1, $f_{\pi(2)}$, and remove these from further consideration. Repeat this process k times, where k<<n. In an example embodiment, the process is repeated until a number of remaining columns (features) is equal to or smaller than the requested value.

In an example embodiment, the second mechanism is an instantiation of the same problem and solution involved in the first mechanism. But, the second mechanism includes a reduction of (abstract) features derived from deep learning of images. The rows of Table 12a (FIG. 2) can, for instance, be an images of an object (for example, an image of a cat), where 1024 columns (that may be taken from a "first depository" of feature extractor images) or 4096 columns (that may be taken from a "second depository" of feature extractor images) of float point decimals are obtained after passing each image through the already-trained first depository or second depository of a convolutional neural network (CNN). Even with binary quantization of these floating-point decimals, $2^{10}$ and $2^{12}$ binary values would be involved in this example. In a small IoT device with a single microprocessor, up to $\sim 2^4$ or 16 binary features may be stored. In the instant example embodiments, a selection of ~16 features that are obtained from the top 16 eigenvectors of the 1024×1024 matrix from the first depository features or 4096×4096 matrix from the second depository features. The reduced set is still used for identification/classification of images but now in a low storage/computation environment.

Example Structural Embodiment

Figure 5:
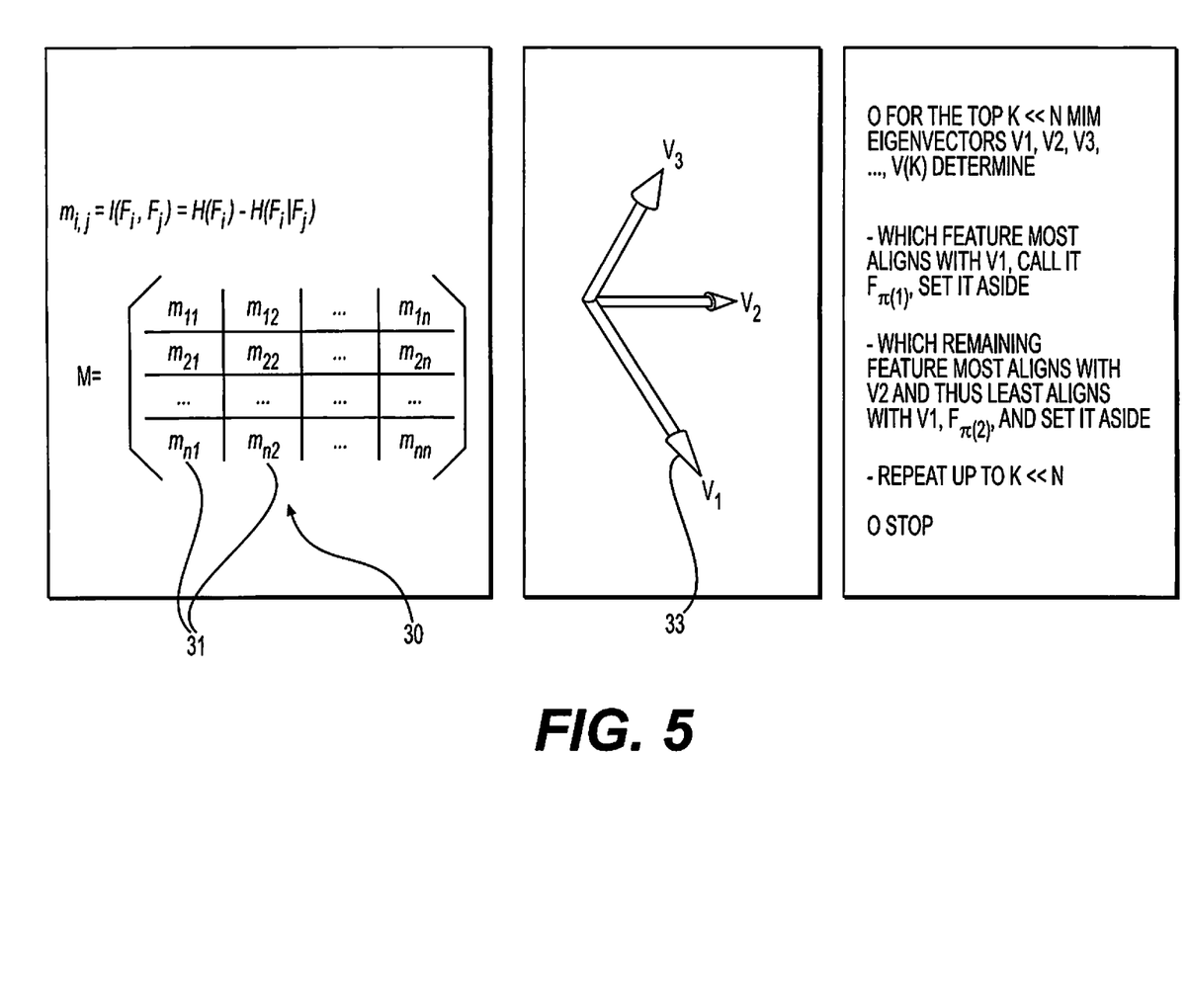
FIG. 5 illustrates a general process of forming a mutual information matrix (MIM) of features, ordering eigenvalues and scoring features of the data, in accordance with an example embodiment.
Figure 6:
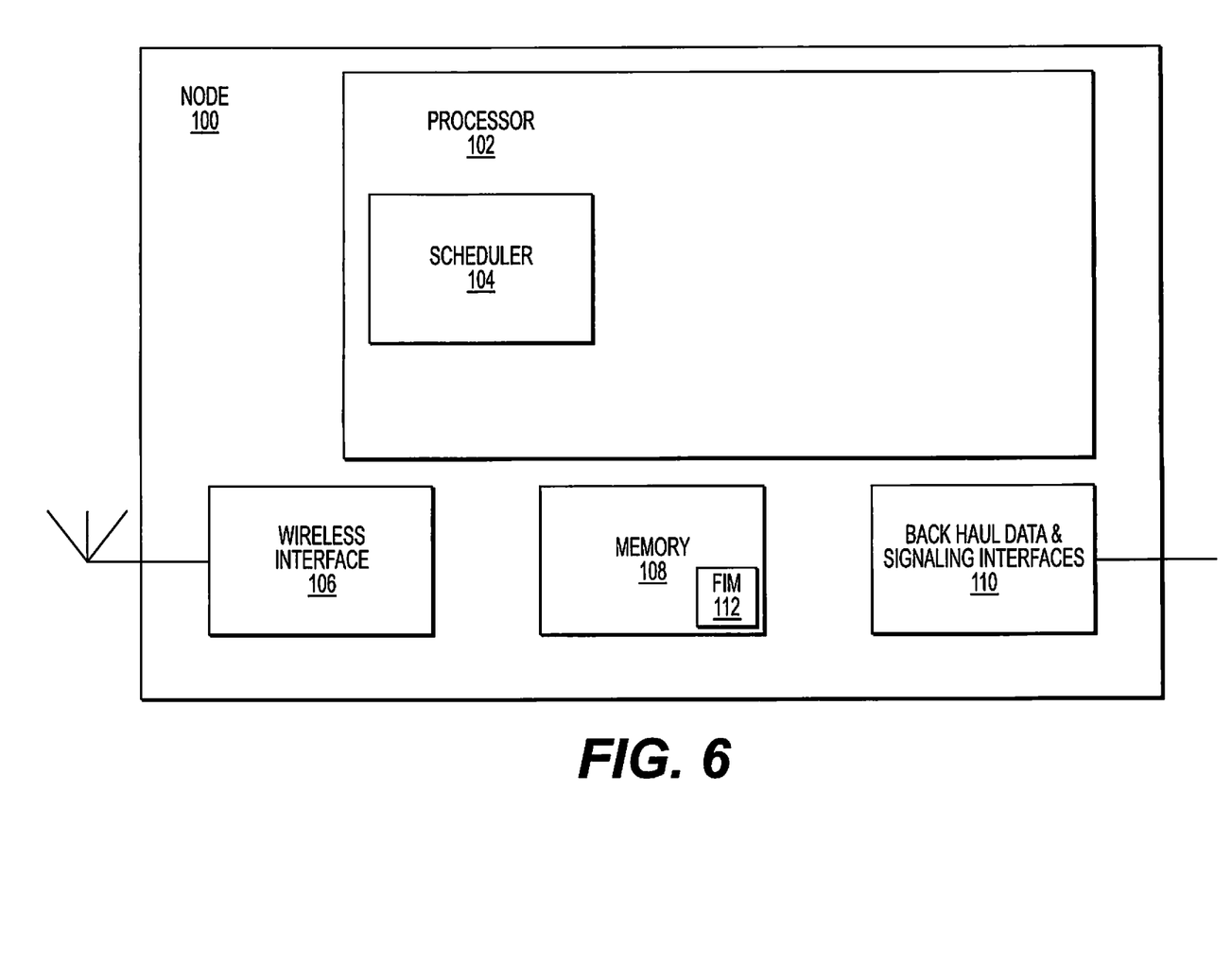
FIG. 6 illustrates a network node, in accordance with an example embodiment.
Figure 7:
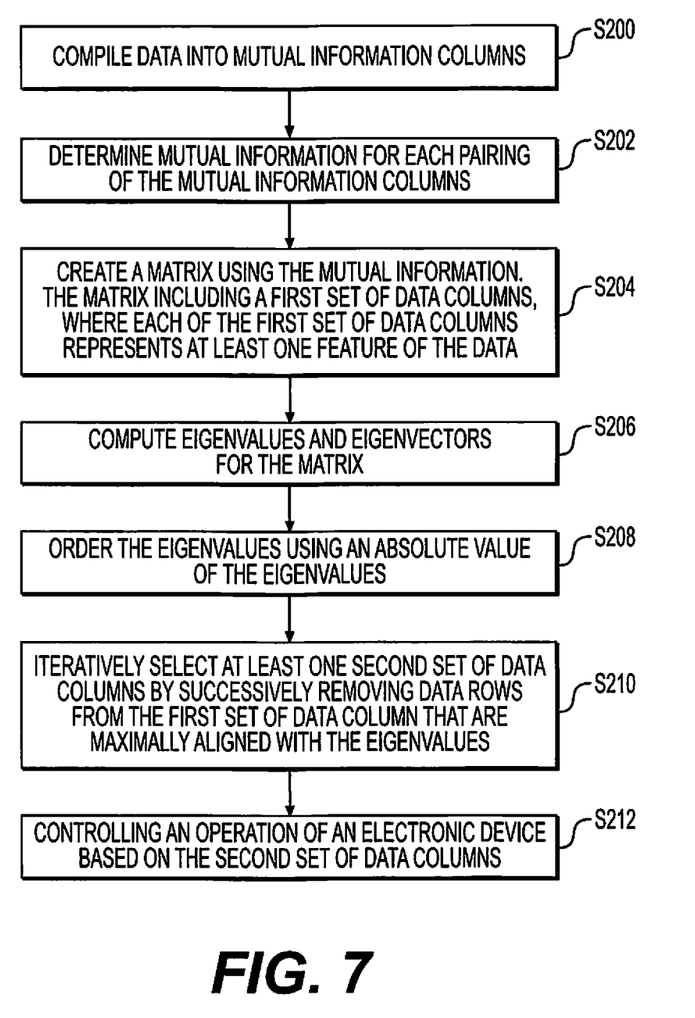
FIG. 7 illustrates a flowchart including method steps for compiling data and selecting features of the data, in accordance with an example embodiment.

FIG. 5 illustrates a network node 100, in accordance with an example embodiment. In an example embodiment, the network node 100 includes wireless interfaces 106, a backhaul interface 110, a memory storage 108 and at least one processor 102. The at least one processor 102 is operationally connected to the interfaces 106/110 and the memory 108. The at least one processor 102 may include a scheduler 104 for scheduling transmissions to and from the network node 100. In an example embodiment, the memory 108 includes a feature identification module (FIM) 112 that includes computer-readable instructions. In an example embodiment, the computer readable instructions includes instructions that cause the at least one processor 102 to perform operational steps of the example embodiments. In particular, the computer-readable instructions of the FIM 112 cause the at least one processor 102 to perform the method steps included in the flowchart of FIG. 6, which is described below.

In an example embodiment, the network node 100 is a stand-alone server in a communication network. In an example embodiment, the network node 100 is a network base station, a $3_{rd}$ generation partnership project (3GPP) evolved Node B (eNB) monolithic network base station, another existing network device, or a virtual network function (VNF) hosted in a device or server within a communication network.

Embodiment of Example Method

In an example embodiment, and as stated above, IoT data input, such as that shown in tables 12a and 22, can contain a potentially large number of features, represented by records/rows 10a/20 within the tables 12a/22. The instant example embodiments may identify significantly important features, without any initial understanding of relationships between the features, by performing the following basic steps.

Step 1: Iteratively picking features/columns that most closely align with the most significant eigenvectors used to represent the raw data.

Step 2: Remove the closely aligned features/columns further consideration.

Step 3: Repeat this process until the most important features are selected.

FIG. 5 illustrates a flowchart of a method, in accordance with an example embodiment. In an example embodiment, the steps of this method are performed by the processor 102 of the network node 100, where the FIM 112 in memory 108 includes the computer-readable instructions for the processor 102 for these method steps. In step S200, the processor 102 compiles data 2 into columns 31 (see FIG. 2), where each column 31 represents at least one feature of the data 2.

In step S202, the processor 102 computes mutual information for each pairing of the columns 31. Specifically, the processor 102 computes the mutual information for each pair of the columns 31 of the MIM matrix 30 using a given order of the columns numbered 1 to n. For example, starting with column 1, I(C1;C1), then I(C1;C2), . . . , I(C1;Cn) is computed. Because there may be numerous rows, there is sufficient data to estimate p(Ci,Cj)), as follows.

$$I(Ci; Cj) = \sum_{ci,cj} p(ci, cj) * \log\left(\frac{p(ci, cj)}{p(ci) * p(cj)}\right) \qquad \text{Eq. 1}$$

In step S204, the processor 102 creates a matrix 30 using the mutual information. The matrix 30 includes a first set of data columns 31, where each of the first set of data columns 31 represents at least one feature of the data. In an example embodiment, the processor 102 creates an n×n matrix 31, represented as MIM=(m(ij))=(I(Ci;Cj)). In an example embodiment, the processor 102 confirms that the matrix 30 is non-negative and symmetric, prior to step S206.

In step S206, the processor 102 computes eigenvalues and corresponding eigenvectors 33 using the matrix 30. In an example embodiment, the eigenvalues of the MIM matrix 30 are represented as shown below.

$$\lambda_i, \text{ where } |\lambda_1| \geq |80_1| \geq \ldots \geq |\lambda_n| \qquad \text{Eq. 2}$$

The corresponding eigenvectors are represented as follows.

$$v_i \text{ for } i=1, \ldots, n \qquad \text{Eq. 3}$$

where $MIM \cdot v_i = \lambda_i \cdot v_i$, $1 <= i <= n$

In step S208, the processor 102 orders the eigenvalues using the absolute value of the eigenvalues that are associated with each eigenvector.

In step S210, the processor 102 iteratively selects at least one second set of data columns by successively removing data rows from the first set of data columns 31. That is to say, the processor 102 selects a subset of the data columns 31 of the matrix 30. In an example embodiment, the processor 102 accomplishes this by iteratively computing a maximal alignment of the features, which are represented by $L_2$ normalized columns $m_i$ of the MIM matrix 30, for i=1, . . . , n, where the processor 102 removes columns 31 (i.e., removes features) from further consideration, until the required s<<n features are selected, which is represented as: for k=1, . . . , s, let $i_1, \ldots, i_{k-1}$ be the indices of features already selected. Then find $i_k$ where $$i_k = \arg\max_{i \notin \{i_1, \ldots, i_{k-1}\}} |\langle m_i, v_k \rangle|.$$

That is to say, at step k find the feature that is 1) not identified already $i \notin \{i_1, \ldots, i_{k-1}\}$ and 2) is maximally aligned with $v_k$. An $L_2$ normalization of a vector $\alpha = (\alpha_1, \ldots, \alpha_n)$, means the transformation $$a \rightarrow a' = \frac{(a_1, \ldots, a_n)}{\sqrt{\sum_i a_i^2}}.$$

The maximal alignment of the features corresponds with the features associated with the highest-ordered eigenvalues, of the ordered set of eigenvalues.

In step S212, the processor 102 controls an operation of an IoT device 1, using the iteratively selected features. In an example embodiment, the IoT device 1 includes at least one processor 1a, where the at least one processor 1a actuates the IoT device 1. For example, the IoT device 1 may be a vehicle, where selected features 24 may include road visibility, speed and a global positioning system (GPS) physical location. Following the selection of these features 24, the processor 102 may, for instance, send a command to a transceiver 3 on the vehicle to cause a processor 1a on the vehicle to adjust the vehicle lights (lights on/off, lights dimmed, high-beams on, etc.). Other examples may for instance include an IoT device on a satellite, or inside a nuclear reactor, where human interaction is difficult or not possible, where the processor 102 may send information or commands to cause the IoT device to react based on the feature selection.

Other Embodiments of Example Method

In another example embodiment, at least two other method schemes of selecting the columns (features) of the data are possible. These schemes are included below.

---
Scheme 2: Sequential alignment with orthogonal directions $$i_1 = \arg\max_i \|\hat{f}_i\|$$

$$i_k = \arg\max_{i \notin \{i_1, \ldots, i_{k-1}\}} |\langle \hat{f}_i, n_k \rangle|, k = 2, \ldots, m$$

$$n_k \in \text{Ker}\{\hat{f}_{i_1}, \ldots, \hat{f}_{i_{k-1}}\}$$

---
Scheme 3: Additive Alignment with Eigensystems $$i_k = \arg\max_{i \notin \{i_1, \ldots, i_{k-1}\}} \theta_i, k = 1, \ldots, m$$

$$\theta_i = \sqrt{\sum_j \langle f_i, v_j \rangle^2 \lambda_j^2}$$
$$f_i = \Sigma_j \langle f_i, v_j \rangle v_j$$

---

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the example embodiments. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the example embodiments, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

Example embodiments may be utilized in conjunction with various telecommunication networks and systems, such as the following (where this is only an example list): Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

What is claimed is:

1. A method of feature selection, comprising:
   receiving, by at least one first processor of a first network node, data from an internet-of-things (IoT) device, the data including at least one environmental condition at the IoT device;
   compiling, by the at least one first processor, the data into mutual information columns;
   determining, by the at least one first processor, mutual information for each pairing of the mutual information columns;
   creating, by the at least one first processor, a matrix using the mutual information, the matrix including a first set of data columns, wherein each of the first set of data columns represents at least one feature of the data, an a priori knowledge of a relationship between the at least one feature of each of the first set of data columns being unknown to the at least one first processor when the data is received;
   computing, by the at least one first processor, eigenvalues and eigenvectors of the matrix;
   ordering, by the at least one first processor, the eigenvalues using an absolute value of the eigenvalues;
   iteratively selecting, by the at least one first processor, at least one second set of data columns by successively removing data columns from the first set of data columns based on the ordered eigenvalues; and
   controlling, by the at least one first processor, an operation of the IoT device based on the at least one second set of data columns and the at least one environmental condition.

2. The method of claim 1, wherein the ordering includes ordering the absolute value of the eigenvalues in descending order, and
   wherein the iteratively selecting includes,
      selecting the at least one second set of data columns that are maximally aligned with the eigenvectors, the selecting including sequentially choosing highest-ordered eigenvalues, of the ordered eigenvalues.

3. The method of claim 1, wherein the matrix is symmetric and non-negative.

4. The method of claim 1, further comprising:
   confirming that the matrix is symmetric and non-negative prior to the computing of the eigenvalues.

5. The method of claim 1, wherein the at least one second set of data columns is smaller than the first set of data columns.

6. The method of claim 1, where the matrix is sized to be n×n, where n is a positive integer that represents a total number of features for the data.

7. The method of claim 1, wherein the iteratively selecting is performed until a size of the at least one second set of data columns is equal to or smaller than a determined value or a threshold value.

8. The method of claim 1, wherein the iteratively selecting includes,
   normalizing a vector for each of the first set of data columns, and
   successively removing data columns by iteratively calculating a maximal alignment between the normalized vectors and the eigenvalues and removing the data columns associated with the normalized vectors that are maximally aligned.

9. A network node, comprising:
   a memory including computer-readable instructions; and
   at least one first processor configured to read the computer-readable instructions in order to,
      receive data from an internet-of-things (IoT) device, the data including at least one environmental condition at the IoT device;
      compile data into mutual information columns,
      determine mutual information for each pairing of the mutual information columns,
      create a matrix using the mutual information, the matrix including a first set of data columns, wherein each of the first set of data columns represents at least one feature of the data, an a priori knowledge of a relationship between the at least one feature of each of the first set of data columns being unknown to the at least one first processor when the data is received, compute eigenvalues and eigenvectors of the matrix,
order the eigenvalues using an absolute value of the eigenvalues,
iteratively select at least one second set of data columns by successively removing data columns from the first set of data columns based on the ordered eigenvalues, and
control an operation of the IoT device based on the at least one second set of data columns and the at least one environmental condition.

10. The network node of claim 9, wherein the at least one first processor is further configured to,
order the eigenvalues by ordering the absolute value of the eigenvalues in descending order, and
iteratively select the at least one second set of data columns by selecting the at least one second set of data columns that are maximally aligned with the eigenvectors, the selecting including sequentially choosing highest-ordered eigenvalues, of the ordered eigenvalues.

11. The network node of claim 9, wherein the matrix is symmetric and non-negative.

12. The network node of claim 9, wherein the at least one first processor is further configured to,
confirm that the matrix is symmetric and non-negative prior to the computing of the eigenvalues.

13. The network node of claim 9, wherein the at least one second set of data columns is smaller than the first set of data columns.

14. The network node of claim 9, where the matrix is sized to be nxn, where n is a positive integer that represents a total number of features for the data.

15. The network node of claim 9, wherein the at least one first processor is further configured to,
iteratively select the at least one second set of data columns by iteratively selecting until a size of the at least one second set of data columns is equal to or smaller than a determined value or a threshold value.

16. The network node of claim 9, wherein the at least one first processor is further configured to,
iteratively selecting by,
normalizing a vector for each of the first set of data columns, and
successively removing data columns by iteratively calculating a maximal alignment between the normalized vectors and the eigenvalues and removing the data columns associated with the normalized vectors that are maximally aligned.

* * * * *